UNITED STATES PATENT OFFICE.

JOHN MARION STUKES, OF SAN ANTONIO, TEXAS.

PACKING COMPOUND FOR EGGS.

SPECIFICATION forming part of Letters Patent No. 699,258, dated May 6, 1902.

Application filed February 28, 1902. Serial No. 96,178. (No specimens.)

*To all whom it may concern:*

Be it known that I, JOHN MARION STUKES, a citizen of the United States, residing at San Antonio, in the county of Bexar and State of Texas, have invented certain new and useful Improvements in Packing Compounds for Eggs, &c.; and I do hereby declare that the following is a full, clear, and exact description of the same.

The present invention has relation to that class of packing compounds especially adapted for packing and storing eggs, fruits, vegetables, and like products where it would be found desirable to pack and store the same for a certain length of time, the compound serving as a preservative during storage or while being transported.

The object of the invention is to provide a packing and preserving compound that will retain the eggs, fruits, vegetables, meats, or any perishable product in a natural state and in a sweet, wholesome, and healthful condition.

This compound comprises a mixture of the following ingredients in any suitable proportions, but preferably in substantially the parts herein described: dry shale-dust, five hundred parts; gypsum, (plaster-of-paris, sulfate of calcium,) twenty-five parts; fresh wood-ashes, twenty-five parts; sulfur, one part; dried borax, one part; dried saltpeter, one part; salicylic acid, one part.

In mixing to form the compound the gypsum, wood-ashes, sulfur, borax, saltpeter, and salicylic acid are thoroughly mixed together and then sifted through a fine sieve, after which the shale-dust is added and the whole again thoroughly mixed ready for use.

When packing the eggs or other products— such as fruits, vegetables, meats, seeds, nuts, &c.—a box or other suitable receptacle is used in which the bottom is covered with the compound and a layer of the product placed thereon and then a layer of the compound, which compound enters any spaces around the product to form a filling and packing, this being continued in placing the layers of product and packing until the receptacle is filled.

The ingredients in the packing compound possess many advantages, in that excluding the air it is an antiseptic and preserving mixture, and it can be made very cheaply. The sulfur, borax, and saltpeter unite with the salicylic acid and form a sulfurous antiseptic preservative which combines with the gypsum to form a perfect mixture which has the properties of destroying the microscopic vegetable and animal organism upon which fermentation and putrefaction depend. Consequently this compound possesses the ingredients that will successfully prevent or suspend and altogether arrest this action when it has once begun.

The compound is a perfect specific against infusoria, bacteria, parasites, fungi, animalcula, and other injurious organism.

Having now fully described my invention, what I claim as new, and desire to secure by Letters Patent, is—

A dry packing compound comprising dry shale-dust, gypsum, wood-ashes, sulfur, borax, saltpeter, salicylic acid, substantially in the proportions named.

In testimony that I claim the above I have hereunto subscribed my name in the presence of two witnesses.

JOHN MARION STUKES.

Witnesses:
J. B. HATCH,
E. H. JONES.